(12) United States Patent
Kasuga et al.

(10) Patent No.: US 8,102,752 B2
(45) Date of Patent: Jan. 24, 2012

(54) OPTICAL HEAD AND OPTICAL PICKUP DEVICE WITH A HOLDER STRUCTURE PROVIDING OPTICAL AXIS ADJUSTMENT

(75) Inventors: Kyoji Kasuga, Kyoto (JP); Akiho Yoshizawa, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1031 days.

(21) Appl. No.: 11/476,314

(22) Filed: Jun. 27, 2006

(65) Prior Publication Data

US 2007/0014204 A1 Jan. 18, 2007

(30) Foreign Application Priority Data

Jun. 30, 2005 (JP) ................................. 2005-192412

(51) Int. Cl.
*G11B 7/00* (2006.01)
(52) U.S. Cl. ....................................................... 369/121
(58) Field of Classification Search .......... 369/120–122, 369/116
See application file for complete search history.

(56) References Cited

U.S. PATENT DOCUMENTS

| 2004/0257927 | A1* | 12/2004 | Sogawa et al. | 369/121 |
| 2005/0105452 | A1* | 5/2005 | Kimura | 369/121 |
| 2006/0018359 | A1* | 1/2006 | Yoshizawa et al. | 372/107 |

FOREIGN PATENT DOCUMENTS

| JP | 02-294949 | | 12/1990 |
| JP | 04-139624 | | 5/1992 |
| JP | 05-081693 | | 4/1993 |
| JP | 2001056940 | A * | 2/2001 |

OTHER PUBLICATIONS

Machine-Assisted Translation of JP 2001056940 A.*

* cited by examiner

*Primary Examiner* — Nathan Danielsen
(74) *Attorney, Agent, or Firm* — Edwards Wildman Palmer LLP; David G. Conlin; George N. Chaclas

(57) ABSTRACT

An optical head comprises a laser holder retaining a laser diode, and a holder support retaining the laser holder, and irradiates an information storage medium with laser light from the laser diode to perform recording/reproduction of information. In this optical head, the laser holder is a frame structure that fixes the laser diode, having an abutment portion protruding from a base side of the frame structure. Also, the holder support has a receiving surface that supports by abutment the abutment portion, and a through-hole that lets pass the laser light. The receiving surface is a plane approximately perpendicular to an optical axis of the optical head, the abutment portion being made as an arc surface having a central axis that passes through an emission point of the laser diode and is perpendicular to the optical axis.

19 Claims, 11 Drawing Sheets

OPTICAL HEAD AND OPTICAL PICKUP DEVICE WITH A HOLDER STRUCTURE PROVIDING OPTICAL AXIS ADJUSTMENT

BACKGROUND OF THE INVENTION

This application claims priority under 35 U.S.C. §119(a) on Patent Application Number 2005-192412, filed in Japan on Jun. 30, 2005, the entire contents of which are hereby incorporated by reference.

The present invention relates to an optical head having a construction for performing optical-axis adjustment of laser light, and to an optical pickup device employing such an optical head.

An optical pickup device lets laser light emitted from a laser diode pass through a collimator lens, a beam-shaping prism, an objective lens and the like to irradiate an information storage medium, and by a light detector reads light reflected from the surface of the information storage medium as an optical signal.

The laser light is parallelized by the collimator lens, shaped into a circular beam by the beam-shaping prism, passes a beam splitter to be focused by the objective lens, and is irradiated onto the information storage medium. The light reflected from the information storage medium is guided by the objective lens to be reflected in rectangular direction by the beam splitter, and received by the light detector. In order for the laser light to pass through a prescribed optical path like this, each optical component is positioned such that optical axes coincide.

While the laser diode emitting the laser light is positioned for the optical axis of the laser light to coincide with the optical axis of the optical pickup device, the laser diode shows variances in the optical axis depending on individual manufactured products. Therefore, for each individual manufactured product the installation angle and position of the laser diode need to be adjusted.

For this reason, optical heads in which a laser diode is fixed are provided with a construction for adjusting the optical axis of the laser light.

Constructions relating to optical-axis adjustment of optical heads in conventional optical pickup devices will be described based on FIG. 9 through FIG. 11.

FIG. 9 is an outline view of an optical head of a first conventional example. FIG. 10 is an outline view of an optical head of a second conventional example. FIG. 11 is an outline view of an optical head of a third conventional example.

For example, the optical head 101 of the first conventional example includes a laser diode 111, a holder 121 retaining the laser diode 111, and an adapter 131 fixing the holder 121 to a housing 141, the holder 121 being fixed to the adapter 131 by holder fixation screws 171, and the adapter 131 being fixed to the housing 141 by adapter fixation screws 181. The construction involves screwing the holder fixation screws 171 out and in for tilting the holder 121 to adjust the tilt of the laser diode 111, as well as adjusting the adapter fixation screws 181 for moving the adapter 131 with the holder 121 as a whole to adjust the position of the laser diode 111 (see JP H2-294949A).

Also, the optical head 201 of the second conventional example includes a laser diode 211, an adjustment strip 221, which adjusts the tilt of the laser diode 211, and a fixation board 291, which fixes the laser diode 211 against the adjustment strip 221. The adjustment strip 221 is a U-shape made from a flat strip, one of the even sections being fixed to a housing 231, with an opening 223 provided approximately in the center portion of both even sections, into which the laser diode 211 is fixedly inserted. The U-shaped adjustment strip 221 is provided with an adjustment screw 271 at its end. By screwing this adjustment screw 271 out and in, the gap of the U is widened and narrowed to adjust the degree of parallelity of the U, by means of which the tilt of the laser diode 211 is enabled to be adjusted. Also, because the diameter of the opening 223 is somewhat greater than the diameter of the laser diode 211, the position of the laser diode 211 is enabled to be adjusted (see Japanese patent publication 2835778).

Also, the optical head 301 of the third conventional example includes a laser diode 311, a retaining holder 381 that retains the laser diode 311, and a fixation seat 321 that retains the retaining holder 381. The retaining holder 381 is provided in its center portion with an opening 383 for fixing the laser diode 311. The laser diode 311 is fixed, its outer edge having been shaped into a spherical surface portion 385 by spherical machining. On the other hand, the fixation seat 321, which retains the retaining holder 381, is provided in its center portion with a fixation-seat opening 323. This fixation-seat opening 323 is provided with a spherical receiving portion 325, which has been machined into a spherical surface that abuts the spherical surface portion 385 of the retaining holder 381. Consequently, the spherical surface portion 385 and the spherical receiving portion 325 move rotationally while making sliding contact, thus enabling the tilt of the optical head 301 to be adjusted. Also, because the emission point of the laser diode 311 is positioned such as to come to lie in the center of the spherical surface, the location of the emission point does not change even when changing the tilt. (JP H5-81693A).

However, in each of the conventional examples the optical-axis adjustment is a difficult operation, requiring time at the time of adjustment.

Specifically, in case of optical-axis adjustment by the first conventional example, it would be necessary to screw out and in each of the screws 171, 181, which would require time. Also, although by screwing out and in the holder fixation screws 171 to tilt the holder 121 the laser diode 111 is tilted, the location of the emission point of the laser diode 111 is unintentionally changed at the time. That is, because the holder 121 is tilted with fixation screws on one side of holder 121 acting as fulcrum, the emission point of the laser diode 111 fixed to the holder 121 moves around a center at the fulcrum. Therefore, even if one desired to adjust the tilt of the laser light only, it would be necessary to perform locational adjustment as well.

Also, in case of adjusting the tilt of the laser diode 211 in the second conventional example, although there being the merit of being able to adjust using a single adjustment screw 271, the adjustment strip 221 is tilted pivoting on the end portion opposite from where the adjustment screw is located. Therefore, there would be the problem that the location of the emission point of the laser diode 211 fixed to the adjustment strip 221 changes. Also, in case of carrying out locational adjustment, loosening and fastening the screws of the fixation board 291 would still be required and consume time.

Furthermore, in the third conventional example, although the location of the emission point of the laser diode 311 does not change, in case of carrying out locational adjustment of the laser diode 311 it would be necessary and time-consuming to loosen the bond of the fixed seat 321 with the housing in which it is fixed, to carry out the locational adjustment.

SUMMARY OF THE INVENTION

The present invention has been accomplished by taking heed of such circumstances, and lies in providing an optical head and optical pickup device for which optical-axis adjustment can be easily performed, without causing the location of the emission point to change in the optical-axis direction.

An optical head according to the present invention is an optical head comprising a laser holder retaining a laser diode, and a holder support retaining the laser holder, for irradiating an information storage medium with laser light from the laser diode to perform recording/reproduction of information, wherein the laser holder is a frame structure that fixes the laser diode, having an abutment portion protruding from a base side of the frame structure, the holder support has a receiving surface that supports by abutment the abutment portion, and a through-hole that lets pass the laser light, and the receiving surface is a plane approximately perpendicular to an optical axis of the optical head, the abutment portion being an arc surface having a central axis, which passes through an emission point of the laser diode and is perpendicular to the optical axis.

Due to this composition, even when the laser holder is tilted for the optical-axis adjustment, the laser holder moves rotationally around the central axis, and consequently the location of the emission point does not change in the optical-axis direction. Therefore, while conventionally the location of the emission point would change in the direction of the optical axis when the angle of the laser holder is changed, making it necessary to adjust the location of the emission point each time the angle was changed, such an operation can be simplified.

Also, because the receiving surface is a plane approximately perpendicular to the optical axis, the location of the emission point does not change in the optical-axis direction of the optical head even when letting the abutment portions of the laser holder abut the receiving surface while moving them at the same time. That is, because there is no location change of the emission point in the optical-axis direction even when performing angular adjustment and locational adjustment, the angular adjustment and the locational adjustment can be performed simultaneously. Therefore the adjustment operation can be performed smoothly.

Also, because the laser holder is not of a construction to be fixed to the holder support by screws or like connecting parts, a small number of components suffices. Also, because it is not necessary, in case of carrying out angular adjustment or locational adjustment, to loosen and fasten screws and the like, the duration of the adjustment operation can be shortened.

Also, because the holder support has an even receiving surface, it can be easily machined to high precision, while manufacturing cost can be kept low.

Also, in the optical head according to the present invention the abutment portion is formed in a pair, respectively in two opposing locations of the frame structure.

Due to this composition, the laser holder is abutted by the receiving surface through abutment portions lined up at a distance in two opposing locations, so that the laser holder is stably supported by the holder support.

Also, in the optical head of the present invention the laser holder has a vertex portion corresponding to the abutment portion, at a head side opposing the base side, and the holder support has a pressure means for pressing the vertex portion in a direction in which the abutment portion presses the receiving surface.

Due to this composition, because the laser holder is supported by pressure onto the holder support by the pressure means, the position of the laser holder is always fixedly retained, locational adjustment and angular adjustment are easy to perform, and also post-adjustment operations are facilitated. That is, in case of a construction where the position of the laser holder were not retained, the post-adjustment state would have to be temporarily fixed by tools and the like. However, such temporary fixing is made superfluous.

Also, because the laser holder is not pressed by the pressure means from directions other than the optical-axis direction (direction perpendicular to the optical axis of the optical head), the laser holder can be easily moved into a direction perpendicular to the optical axis, and also easily be tilted.

Also, in the optical head of the present invention the vertex portion is a protuberance made up by an arc surface having the central axis, and the pressure means is configured to press the vertex portion by a pressure part having an even pressure surface perpendicular to the optical axis.

Due to this composition, because the abutment portion and the vertex portion include arc surfaces having a central axis that is perpendicular to the optical axis and passes through the emission point, it follows that even when the laser holder is tilted, the laser holder moves rotationally around the central axis and therefore the distance between the central axis and the abutment point where the abutment portion abuts the receiving surface, and the distance between the central axis and the pressure contact point where the vertex portion touches the pressure surface do not change. That is, because the distance between the abutment point and the pressure contact point is constant, the force by which the pressure part presses against the vertex portion does not change, and the laser holder is held by pressure in a permanently stable state.

Also, from the fact that the abutment portion and the vertex portion are made of arc surfaces having a central axis that is perpendicular to the optical axis and passes through the emission point, and the receiving surface and the pressure surface are planes perpendicular to the optical axis of the optical head and thus parallel to each other, it follows that because the direction of pressure of the pressure surface is always in the direction of the optical axis even when the laser holder is tilted to move it rotationally around the central axis, the laser holder is held by pressure in a stable position.

Also, in the optical head of the present invention, the distance from the central axis to the arc surface of the abutment portion is smaller than the distance from the central axis to the arc surface of the vertex portion.

Due to this construction, by making the radius of the abutment portion consisting of the arc surface small, the variance of the radius can be made small, and variations of the distance from the emission point to the receiving surface can be suppressed.

That is, because the abutment point of the abutment portion and the receiving surface change due to the laser holder being tilted, the distance from the emission point to the receiving surface is caused to change if the radius of the abutment portion consisting of the arc surface shows variance, but such variation of the distance can be suppressed.

Also in the optical head of the present invention, the abutment portion has a taper surface tangentially connecting to the arc surface.

Due to this composition, the gap between the laser holder and the holder support that was created by equipping the laser holder with the abutment portion is made smaller. Therefore, because heat emanating from the laser diode is transmitted via the laser holder to the holder support, the heat radiation properties of the optical head can be improved.

Also, the optical head according to the present invention is an optical head comprising a laser holder retaining a laser diode, and a holder support retaining the laser holder, for irradiating an information storage medium with laser light from the laser diode to perform recording/reproduction of information, wherein the laser holder is a frame structure that fixes the laser diode, provided with an abutment portion having a protruding ridge portion of two intersecting planes at a base side of the frame structure, the holder support has a receiving surface that supports by abutment the abutment portion, and a through-hole that lets pass the laser light, and the receiving surface is a plane approximately perpendicular to an optical axis of the optical head, the ridge portion coinciding with a straight line that passes through an emission point of the laser diode and is perpendicular to the optical axis.

Due to this composition, because the ridge portion abutting the receiving surface passes through the emission point, the laser holder moves rotationally around the ridge portion even when the laser holder is tilted for optical-axis adjustment of the laser light, and the location of the emission point does not change in the optical-axis direction. Therefore, while conventionally the location of the emission point would change in the direction of the optical axis when the tilt of the laser holder is changed, making it necessary to adjust the location of the emission point each time the tilt was changed, such an operation can be simplified.

Also, because the receiving surface is a plane approximately perpendicular to the optical axis, the location of the emission point does not change in the optical-axis direction even when letting the abutment portions of the laser holder abut the receiving surface while moving them at the same time. That is, because there is no location change of the emission point in the optical-axis direction even when performing angular adjustment or locational adjustment, the angular adjustment and the locational adjustment can be performed simultaneously. Therefore the adjustment operation can be performed smoothly.

Also, the portion abutting the receiving surface being the ridge portion of the laser holder, even when tilting the laser holder the portion with which the laser holder abuts the receiving surface does not change. Therefore, the emission point is always on the same plane with the receiving surface, and deviations in optical-axis direction are kept to a minimum.

Also, because the laser holder is not of a construction having been fixed to the holder support by screws or like connecting parts, a small number of components suffices. Also, because it is not necessary, in case of carrying out angular adjustment or locational adjustment, to loosen and fasten screws and the like, the duration of the adjustment operation can be shortened.

Also, because the holder support has an even receiving surface, it can be easily machined to high precision, while screw holes and the like for adjustment are not provided, so that manufacturing cost can be kept down.

Also, because the abutment portion is composed of two planes, the abutment portion can easily be machine-formed at high precision.

Also, in the optical head according to the present invention the abutment portion is formed in a pair, respectively in two opposing locations of the frame structure.

Due to this composition, the laser holder is abutted by the receiving surface through ridge portions lined up at a distance in two opposing locations, so that the laser holder is stably supported.

Also, in the optical head of the present invention the laser holder has a vertex portion corresponding to the abutment portion at a head side opposing the base side, the vertex portion being a protuberance made of an arc surface that has the ridge portion as central axis, while the holder support has a means for pressing the vertex portion by a pressure part having an even pressure surface perpendicular to the optical axis.

Due to this composition, because the laser holder is supported by pressure onto the holder support by the pressure means, the position of the laser holder is always fixedly retained, locational adjustment and angular adjustment are easy to perform, and also post-adjustment operations are facilitated. That is, in case of a construction where the position of the laser holder were not retained, the post-adjustment state would have to be temporarily fixed by tools and the like. However, such temporary fixing is made superfluous.

Also, because the laser holder is not pressed by the pressure means from directions other than the optical-axis direction (direction perpendicular to the optical axis), the laser holder can be easily moved into a direction perpendicular to the optical axis, and also easily be tilted.

Also, because the vertex portion is made of an arc surface having a central axis coinciding with the ridge portion, and the laser holder moves rotationally around the ridge portion even when the laser holder is tilted, the distance between the abutment point where the ridge portion abuts the receiving surface, and the pressure contact point where the vertex portion touches the pressure surface does not change. That is, because the distance between the abutment point and the pressure contact point is constant, the force by which the pressure part presses against the vertex portion does not change, and the laser holder is held by pressure in a permanently stable state.

Also, from the fact that the vertex portion is made of an arc surface having a central axis that coincides with the ridge portion, and the receiving surface and the pressure surface are planes perpendicular to the optical axis and thus parallel to each other, it follows that because the direction of pressure of the pressure surface is always in the direction of the optical axis even when the laser holder is tilted to move it rotationally around the central axis, the laser holder is held by pressure in a stable position.

Also, in the optical head of the present invention the holder support is unified with the housing of an optical pickup device.

Due to this composition, because the laser holder is mounted directly to the housing of the optical pickup device without via a holder support, a dedicated part as holder support can be reduced, and manufacturing cost can be reduced.

An optical pickup device according to the present invention is an optical pickup device for irradiating an information storage medium with laser light from an optical head to perform recording/reproduction of information, wherein the optical head is an optical head according to the present invention.

Due to this composition, because optical-axis adjustment of the laser light axis of the optical pickup device can easily be performed, the efficiency of the optical-axis adjustment operation can be increased.

DESCRIPTION OF THE PREFERRED EMBODIMENTS

In the following embodiments of the present invention are described based on the Figures.

Embodiment 1

An optical head being the work of Embodiment 1 of the present invention will be explained based on FIG. 1 through FIG. 5.

Figure 1:
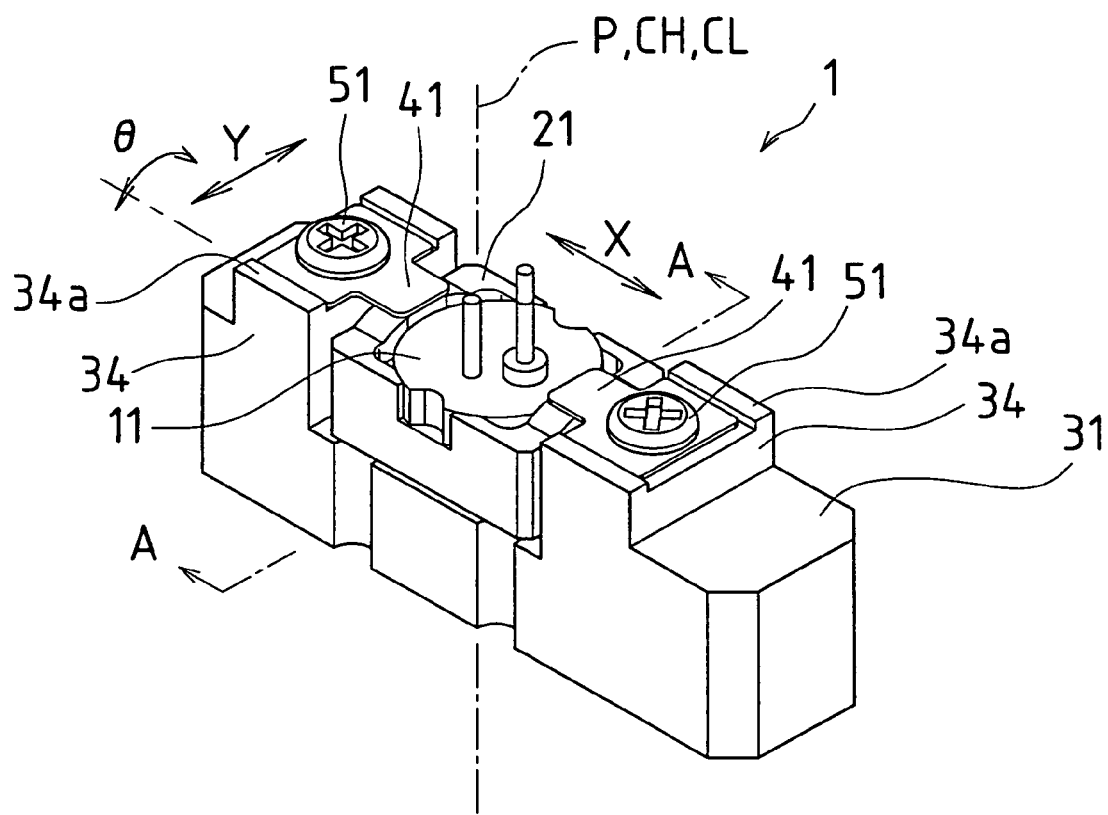
FIG. 1 is a perspective view of an optical head according to Embodiment 1 of the present invention.
Figure 2:
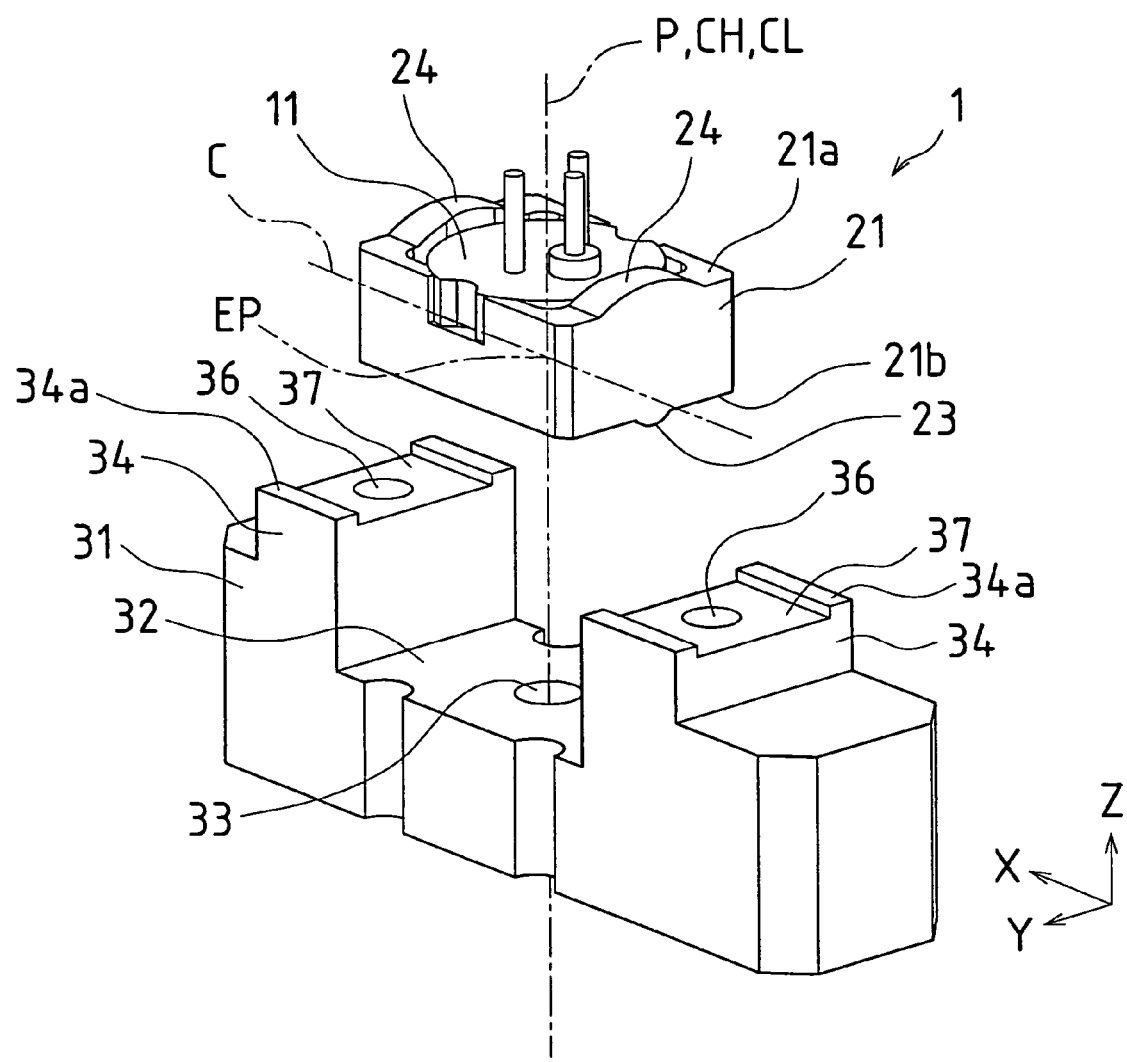
FIG. 2 is a detached perspective view showing a laser holder and a holder support of the optical head according to Embodiment 1 of the present invention in detached state.
Figure 3:
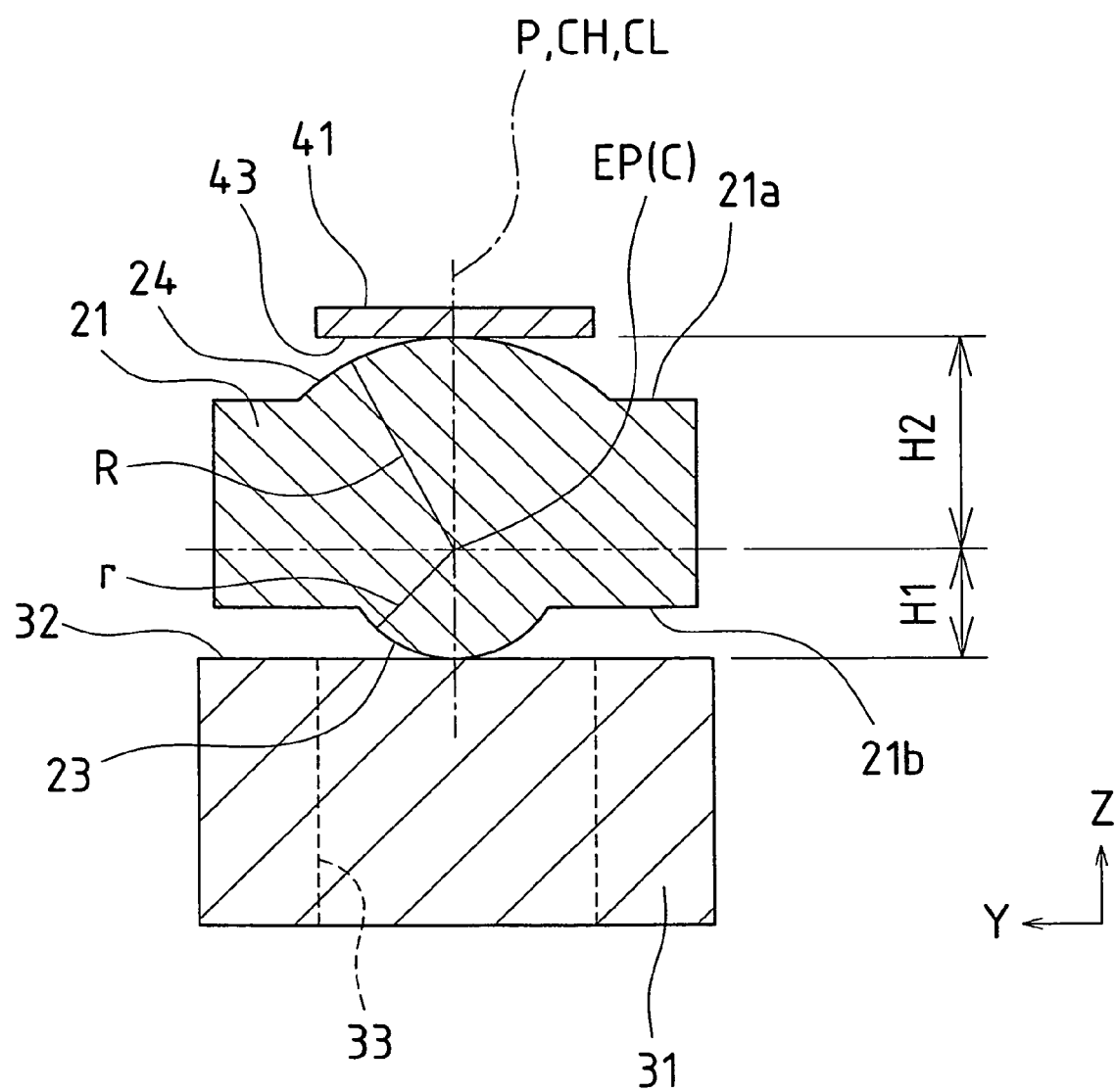
FIG. 3 is an outline cross section of the optical head seen from the arrow symbols A-A in FIG. 1, in a state where the central axis of the laser holder and the central axis of the optical head have been brought into coincidence.
Figure 4:
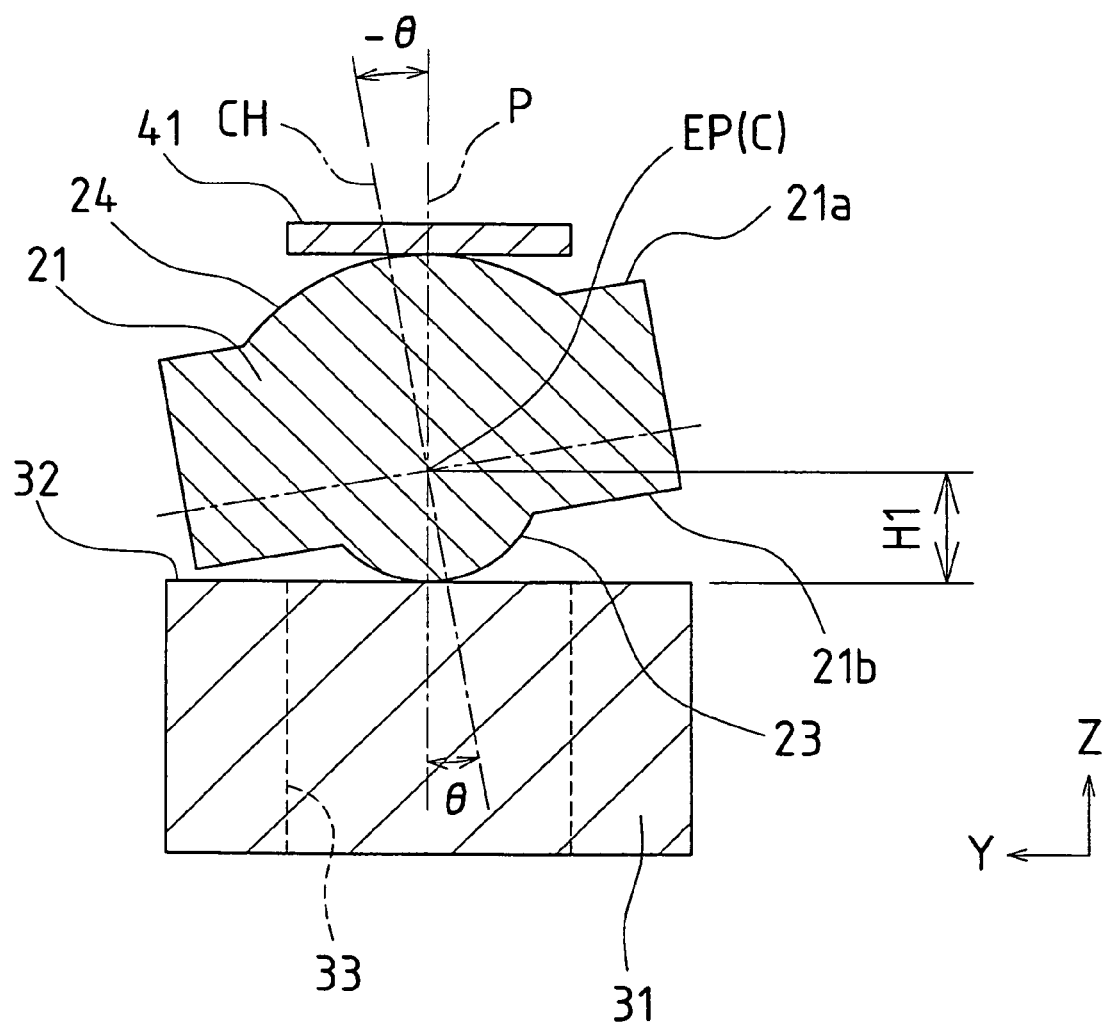
FIG. 4 is an outline cross section of the optical head seen from the arrow symbols A-A in FIG. 1, in a state where the central axis of the laser holder has been tilted with respect to the central axis of the optical head.
Figure 5:
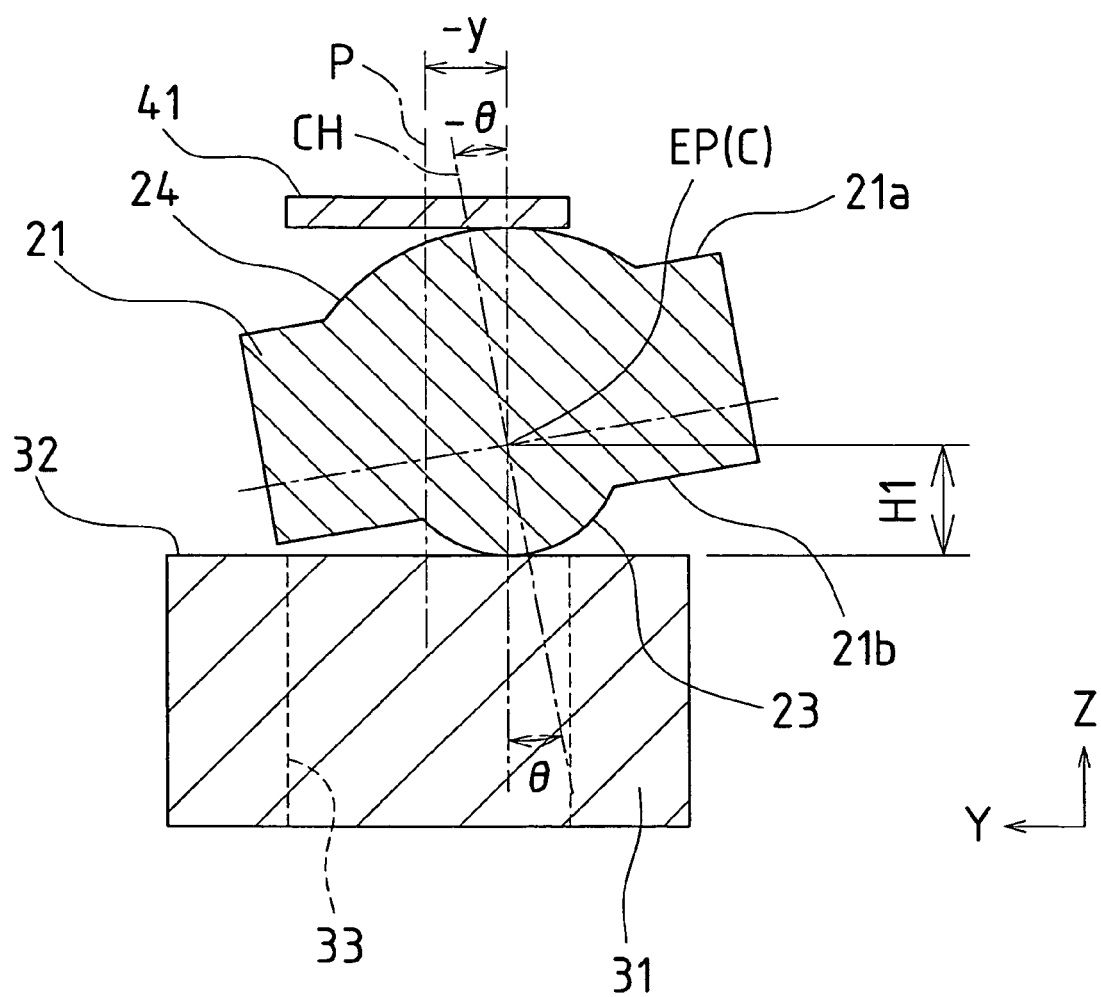
FIG. 5 is an outline cross section of the optical head seen from the arrow symbols A-A in FIG. 1, in a state where the central axis of the laser holder has been tilted with respect to the central axis of the optical head and shifted into Y-direction.

FIG. 1 is a perspective view of the optical head according to Embodiment 1 of the present invention. FIG. 2 is a detached perspective view showing a laser holder and a holder support of the optical head according to Embodiment 1 of the present invention in detached state. FIG. 3 is an outline cross section of the optical head seen from the arrow symbols A-A in FIG. 1, in a state where the central axis of the laser holder and the central axis of the optical head have been brought into coincidence. FIG. 4 is an outline cross section of the optical head seen from the arrow symbols A-A in FIG. 1, in a state where the central axis of the laser holder has been tilted with respect to the central axis of the optical head. FIG. 5 is an outline cross section of the optical head seen from the arrow symbols A-A in FIG. 1, in a state where the central axis of the laser holder has been tilted with respect to the central axis of the optical head and shifted into Y-direction.

Yet, a depiction of constituent pressure parts 41 has been omitted from FIG. 2.

In an optical pickup device, the laser light emitted by a laser diode 11 of the optical head 1 is parallelized by a collimator lens, shaped into a circular beam in a beam-shaping prism, and after passing a beam splitter focused by an objective lens onto an information storage medium. The reflected light that is reflected from the information storage medium is provided for to be detected in a light detector in order for information to be read out. The above optical components are arranged such that their respective optical axes coincide with the optical axis of the optical pickup device. From this, because in the present optical pickup device the laser light is focused in an appropriate state onto the information storage medium, the focusing position is prevented from getting off a track of the information storage medium. Consequently, tracking errors and the like do not occur, and information can be stably detected.

Although in this way the laser diode 11 is positioned to make the optical axis of the laser light coincide with the optical axis of the optical pickup device, the optical axis of the laser light of the laser diode 11 deviates depending on individual manufactured products. For this reason, in the optical head 1 by which the laser diode 11 is fixedly supported, a construction for adjusting the emission angle of the laser light and the location of the emission point of the laser diode 11 has been provided with the goal of adjusting the optical axis of the laser light. The construction of the optical head 1 will be described in the following.

The optical head 1 comprises the laser diode 11, a laser holder 21 retaining the laser diode 11, and a holder support 31 supporting by abutment the laser holder 21. Each of these components is arranged in alignment with the optical axis P of the optical head 1.

The laser holder 21 is a tubular frame structure made up of four side-walls. The laser holder central axis CH, which passes through the center of this frame structure, is arranged to coincide with the optical axis P of the optical head 1. The laser diode 11 is fixed in the interior of the frame structure of the laser holder 21, the laser diode central axis CL and the laser holder central axis CH again being made to coincide. By bringing the optical axis P of the optical head 1 into coincidence with the optical axis of the optical pickup device, the laser diode central axis CL and laser holder central axis CH coincide with the optical axis of the optical pickup device (see FIG. 2).

Furthermore, the optical axis of the laser light emitted from the laser diode 11, although showing variation according to manufactured product, approximately coincides with the laser diode central axis CL, and consequently happens to approximately coincide with the optical axis of the optical pickup device. Therefore, the adjustment of the optical axis of the laser light becomes an adjustment operation for bringing approximately coinciding optical axes into a further optimized state.

At the bases 21b of two opposing side-walls of the laser holder 21 a pair of protruding abutment portions 23 have been shaped, such as to interpose a discharge opening for the laser light. Each abutment portion 23 is made up by an arc surface of radius r having a central axis C that is perpendicular to the optical axis P of the optical head 1 and passes through the emission point EP of the laser diode 11. Therefore, the emission point EP of the laser diode 11 is positioned at a fixed distance H1 from a receiving surface 32 that abuts both abutment portions 23, 23 (see FIG. 3).

Furthermore, an abutment portion 23 may also be formed in only a single location at the base of an arbitrary side-wall.

From the head 21a opposing the base 21b of the frame structure of the laser holder 21, vertex portions 24 protrude to correspond to respective abutment portions 23. Both vertex portions 24, 24 include an arc surface of radius R having the central axis C, which is perpendicular to the optical axis P of the optical head 1 and passes through the emission point EP of the laser diode 11. Therefore, the emission point EP of the laser diode 11 is positioned at a fixed distance H2 from a pressure surface 43 that abuts both vertex portions 24, 24 (see FIG. 3).

Also, the distance from the central axis C to the arc surfaces that make up the abutment portions 23 (radius r) has been formed smaller than the distance from the central axis C to the arc surfaces that make up the vertex portions 24 (radius R). Because the variation of the radius r becomes smaller for a smaller radius r, by making the radius of the arc surfaces that make up the abutment portions 23 relatively small, the variation in the distance from the central axis C to the arc surfaces that make up the abutment portions 23 can be made small. Therefore, although the contact points of the abutment portions 23 and the receiving surface 32 change when the laser holder 11 is tilted on the occasion of adjusting the laser optical axis, the distance from the emission point EP to the receiving surface 32 hardly changes because the variation in the distance from the central axis C to the arc surfaces that make up the abutment portions 23 is small.

The holder support 31 supports laser holder 21 by abutment and is mounted in a housing (not shown) of the optical pickup device. In other words, the laser holder 21 is fixed to the housing via the holder support 31.

The holder support 31 has the level receiving surface 32 that abuts the pair of abutment portions 23, 23 of the laser holder 21. In the receiving surface 32 a through-hole 33 is provided through which the laser light passes, the central axis of the through-hole 33 being made to coincide with the optical axis P of the optical head 1. The receiving surface 32 has been formed such as to become perpendicular to the optical axis P of the optical head 1. From this follows that the location of the emission point EP does not change with regard to the direction of the optical axis (Z-direction) even when the laser holder 21 is moved into a direction perpendicular to the optical axis P (XY-direction).

Also, the holder support 31 is provided with a pressure means (34, 41) for pressing the laser holder 21 onto the receiving surface 32. By this, the laser holder 21 is pressed onto the holder support 31 to preserve the position of the laser holder 21.

Specifically, the pressure means includes a pair of guides 34 lining up with the laser holder 21 on both sides, and of pressure parts 41 provided at the guide head portions 34a (see FIG. 1). The guides 34 are lined up leaving fixed gaps from the laser holder 21. These gaps are provided because there are circumstances when the laser holder 21 will be displaced in a direction perpendicular to the optical axis P of the optical head 1 (XY-direction) during optical-axis adjustment of the laser light.

The guide head portions 34a have engagement trenches 37 for engaging the pressure parts 41, and screw-holes 36 for screwing in screws 51 for fixing the pressure parts 41 to the guides 34. The pressure parts 41 are fixed to the guide head portions 34a by the screws 51.

The pressure parts 41 form the level pressure surface 43, and are arranged such that they press down the vertex portions 24 in a state where the pressure surface 43 is perpendicular to the optical axis P of the optical head 1 (see FIG. 3).

Because the abutment portions 23 and the vertex portions 24 include arc surfaces having the central axis C, which is perpendicular to the optical axis P of the optical head 1 and passes through the emission point EP, it follows that even when the laser holder 21 is tilted, the laser holder 21 moves rotationally around the central axis C, and therefore the distance between the central axis C and the abutment points where the abutment portions 23 abut the receiving surface 32, and the distance between the central axis C and the pressure contact points where the vertex portions 24 touch the pressure surface 43 do not change. That is, because the distance between the abutment points and the pressure contact points is constant, the force by which the pressure parts 41 press against the vertex portions 24 does not change, and the laser holder 21 comes to be held by pressure in a permanently stable state.

Also, from the fact that the receiving surface 32 and the pressure surface 43 are planes perpendicular to the optical axis P of the optical head 1 and thus parallel to each other, it follows that because the direction of pressure of the pressure surface 43 is always in the direction of the optical axis even when the laser holder 21 is tilted to move it rotationally around the central axis C, the laser holder 21 is held by pressure in a stable position.

Furthermore, the pressure parts 41 are leaf springs consisting e.g. of a metal such as iron, steel, or aluminum, or of plastics and the like.

The pressure means, having been constructed from the guides 34 and the pressure parts 41, may also be constructed by merging the guides 34 and the pressure parts 41 into integrated metal parts that line up with the laser holder 21. Because in this way the pressure means is provided as detachable guide parts, it is possible by merely substituting these to cope with laser holders having various heights.

Also, a composition may be chosen wherein the pressure parts 41 are formed by making them extend from the guides 34, and where the pressure parts 41, the guides 34, and the holder support 31 are merged into one. By doing so, the component count can be reduced.

Next, the angular adjustment and locational adjustment of the laser holder 21 will be described, which is performed when bringing the optical axis of the laser light into agreement with the optical axis of the optical head 1.

First, the optical head 1 is retained by an optical-head adjustment tool (not shown), and the angle and position of the laser holder 21 are adjusted with respect to the holder support 31. For example, the laser holder 21 may be tilted and/or displaced by an adjustment arm of the optical-head adjustment tool.

Specifically, in case that the optical axis of the laser light deviates from the optical axis P of the optical head 1 by an angle θ, the laser holder 21 may be tilted against the optical axis P of the optical head 1 by an angle −θ (see FIG. 4). The angular adjustment is performed by tilting the laser holder 21 while letting the abutment portions 23 of the laser holder 21 about the receiving surface 32.

In this way, even when tilting the laser holder 21 for optical-axis adjustment of the laser light, the location of the emission point EP does not change in the optical-axis direction (Z-direction) because the receiving surface 32 is a plane approximately perpendicular to the optical axis P of the optical head 1, and the abutment portions 23 abutting the receiving surface 32 are made up by arc surfaces having the central axis C, which passes through the emission point EP and is parallel to the receiving surface 32, whence it follows that the laser holder 21 moves rotationally around the central axis C (see FIG. 4).

Also, in case that due to deviations in the mounting position of the laser diode chip the emission point EP deviates by a distance y from the prescribed location while the optical axis of the laser light deviates from the optical axis P of the optical head 1 by an angle θ, the laser holder 21 may be both displaced by a distance −y in a direction perpendicular to the optical axis P of the optical head 1, and tilted against the optical axis P of the optical head 1 by an angle −θ. The angular adjustment and the locational adjustment are performed by moving the laser holder 21 while letting the abutment portions 23 abut the receiving surface 32.

In this way, even when letting the abutment portions 23 of the laser holder 21 abut the receiving surface 32 and moving them parallel, the location of the emission point EP does not change in the optical-axis direction (Z-direction) because the receiving surface 32 is a plane approximately perpendicular to the optical axis P of the optical head 1 (see FIG. 5).

Therefore, because there is no locational change in the optical-axis direction of the optical head 1 (i.e. the direction of the separation of the emission point and the collimator lens), the distance between the emission point of the laser diode 11 and the collimator lens does not change so that there is no change in the focal length. Thus, the degree of parallelity of the laser light parallelized by means of the collimator lens is not changed due to the optical-axis adjustment, and consequently the form of the light spot irradiated onto the information storage medium by concentration at the focal point does not change. That is, because a change in the degree of parallelity of the laser light parallelized by passing through the collimator does not have to be taken into consideration when adjusting the optical axis of the laser light, the optical axis of the laser light can be easily adjusted.

Also, the angular adjustment and the locational adjustment of the laser holder 21 can be performed simultaneously. That is, in the prior art the location of the emission point EP changed in the direction of the optical axis when the angle of the laser holder 21 was changed, which made it necessary to adjust the location of the emission point each time the angle was changed. Since the necessity for such locational corrections due to angular adjustments disappears, the angle and the position can both be adjusted to the optimal state even when performing the angular adjustment and the locational adjustment simultaneously. The adjustment time again is shortened in proportion to what can be performed simultaneously.

Also, because the laser holder 21 is not pressed from any direction (XY-direction) other than the optical-axis direction, it can freely be moved in a direction (XY-direction) perpendicular to the optical axis P of the optical head 1, which makes the adjustment in a direction (XY-direction) perpendicular to the optical axis P of the optical head 1 a convenient operation. That is, because the laser holder 21 is not of a construction where it would be fixed to the holder support 31 and such by screws or like connecting parts, it also is not necessary, in the case of carrying out angular adjustment or locational adjustment, to temporarily loosen the screws or like connecting parts before carrying out the locational adjustment, and to fasten the screws or like connecting parts again afterwards. This enables to shorten the duration of the adjustment operation.

After adjustment of the optical axis, the optical head 1 is detached from the optical-head adjustment tool and fixed with glue to prevent the state after the adjustment from disintegrating.

Because the laser holder 21 is pressed onto the holder support 31 by the pressure means, the position of the laser holder 21 being permanently retained even when detaching the optical head 1 from the optical-head adjustment tool, operations coming after the optical-axis adjustment are facilitated as well. That is, in case of a construction where the position of the laser holder 21 were not retained it would be necessary to provisionally fix the post-adjustment state with tools and the like. However, such provisional fixing is unnecessary.

Embodiment 2

An optical head according to Embodiment 2 of the present invention will be explained based on FIG. 6.

Figure 6:
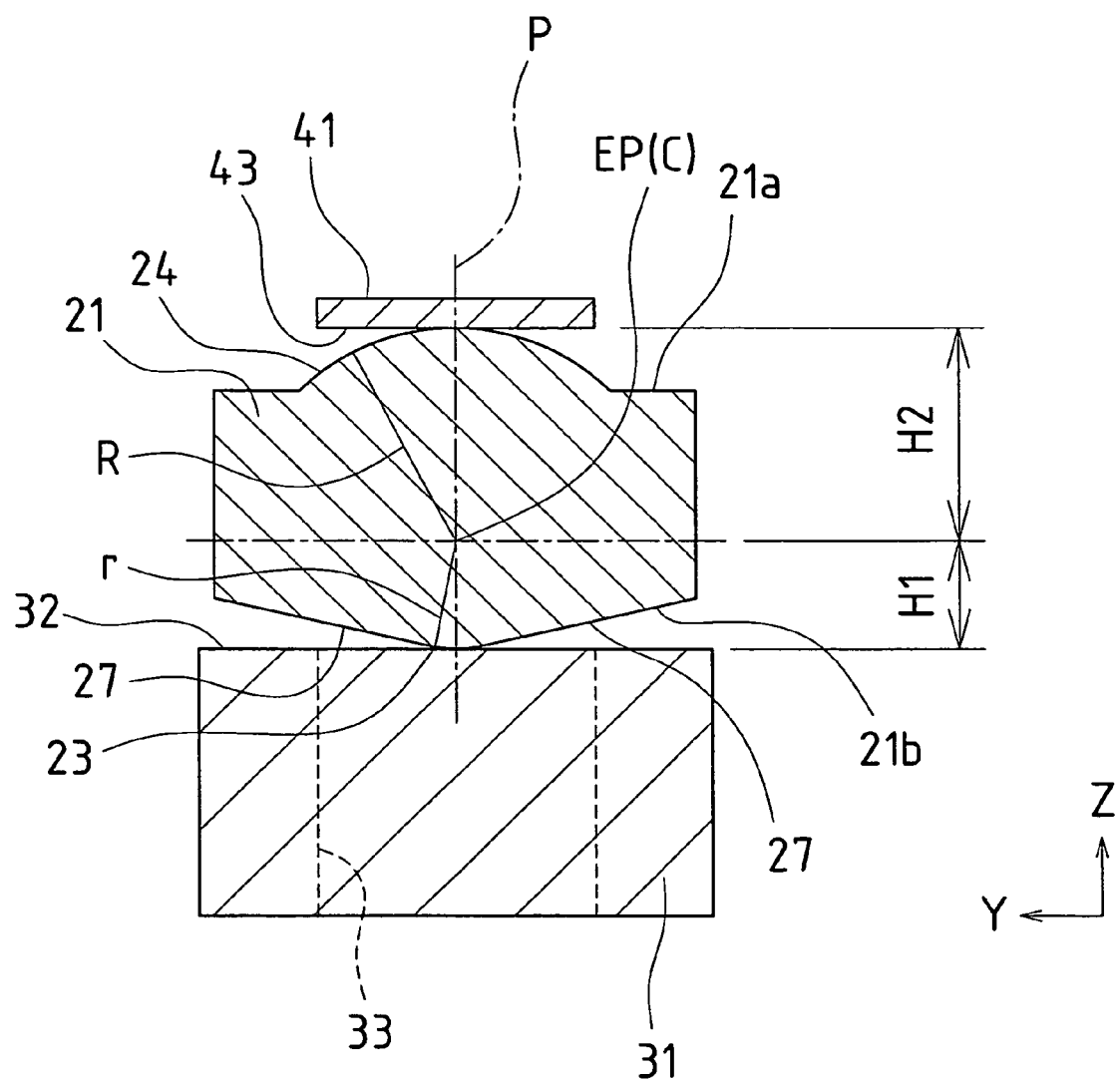
FIG. 6 is an outline cross section of an optical head according to Embodiment 2 of the present invention, taken at a location identical to that of the arrow symbols A-A in FIG. 1, the outline cross section showing a state in which the laser-holder central axis and the optical axis of the optical head coincide.

FIG. 6 is an outline cross section of the optical head according to Embodiment 2 of the present invention, taken at a location identical to that of the arrow symbols A-A in FIG. 1, the outline cross section showing a state in which the laser-holder central axis and the optical axis of the optical head coincide.

The present embodiment is of almost the same configuration as Embodiment 1. That is, the optical head 1 includes a laser diode 11, a laser holder 21 retaining the laser diode 11, and a holder support 31 supporting by abutment the laser holder 21. Because the point of difference to Embodiment 1 is the construction of abutment portions 23 only, this point will be described.

To provide the abutment portions 23 to the laser holder 21, in the same way as in Embodiment 1, at the base 21b of the frame structure of the laser holder 21 a pair of protruding abutment portions 23 have been shaped, such as to interpose the discharge opening for the laser light. Both abutment portions 23, 23 are made up by respective arc surfaces of radius r, with a central axis C that is perpendicular to the optical axis P of the optical head 1 and passes through the emission point EP of the laser diode 11. Therefore, the emission point EP of the laser diode 11 is positioned at a fixed distance from the receiving surface 32 that abuts both abutment portions 23, 23.

In each abutment portion 23 taper surfaces 27, 27 have been formed that continuously tangentially connect to the arc surfaces at a prescribed angle. In short, the gap between the laser holder 21 and the holder support 31 that was created by equipping the laser holder 21 with the abutment portions 23 is made smaller. Therefore, because heat emanating from the laser diode 11 is transmitted via the laser holder 21 to the holder support 31, the heat radiation properties of the optical head 1 are improved.

The heat radiation properties of the optical head 1 can furthermore be improved by constructing the pressure parts 41 of the holder support 31 from materials of high thermal conductivity such as iron or steel.

Moreover, the heat radiation properties of the optical head 1 can be improved by enlarging the area of contact between the vertex portions 24 of the holder support 31 and the pressure parts 41. That is, the heat radiation properties can be improved by increasing the radius of the arc surfaces that make up the vertex portions 24 to enlarge the area of contact between the vertex portions 24 and the pressure parts 41.

By doing so, the life span of the laser diode 11 can be prolonged.

Embodiment 3

An optical head according to Embodiment 3 of the present invention will be explained based on FIG. 7.

Figure 7:
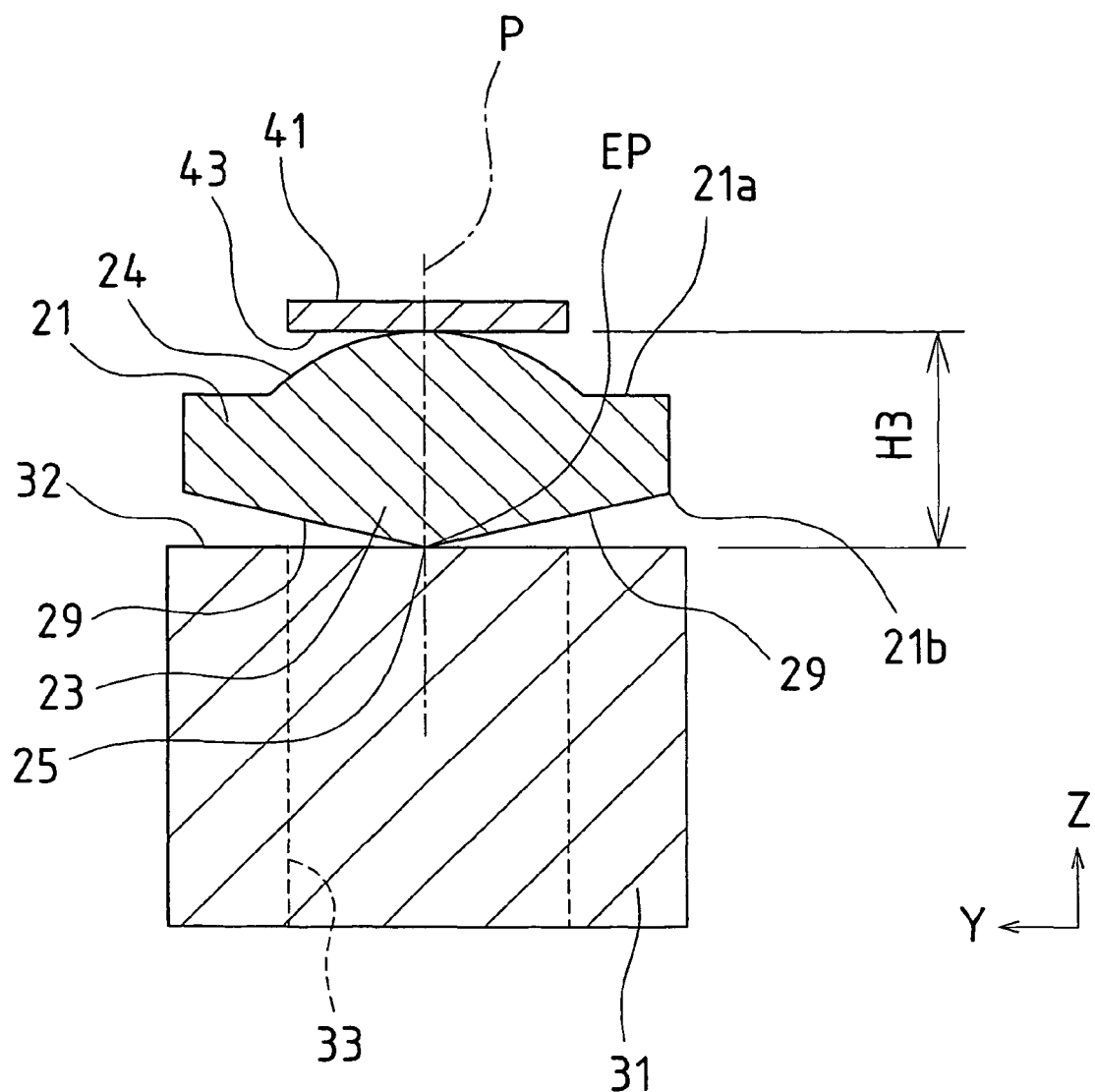
FIG. 7 is an outline cross section of the optical head according to Embodiment 3 of the present invention, taken at a location identical to that of the arrow symbols A-A in FIG. 1, the outline cross section showing a state in which the laser-holder central axis and the optical axis of the optical head coincide.

FIG. 7 is an outline cross section of the optical head according to Embodiment 3 of the present invention, taken at a location identical to that of the arrow symbols A-A in FIG. 1, the outline cross section showing a state in which the laser-holder central axis and the optical axis of the optical head coincide.

The optical head 1 of the present embodiment includes a laser diode 11, a laser holder 21 retaining the laser diode 11, and a holder support 31 supporting by abutment the laser holder 21. Each component is arranged in alignment with the optical axis P of the optical head 1.

The laser holder 21 is a tubular frame structure made up of four side-walls. The laser holder central axis CH, which passes through the center of the frame structure, has been arranged to coincide with the optical axis P of the optical head 1. The laser diode 11 is fixed in the interior of the frame structure of the laser holder 21, the laser diode central axis CL and the laser holder central axis CH being made to coincide. Because the optical axis P of the optical head 1 is brought into coincidence with the optical axis of the optical pickup device, the laser diode central axis CL and laser holder central axis CH coincide with the optical axis of the optical pickup device.

At the base 21b of the frame structure of the laser holder 21 a pair of protruding abutment portions 23 have been shaped, such as to interpose the discharge opening for the laser light. Each abutment portion 23 is a protuberance having a ridge portion 25 formed by the intersection of two planes 29, 29, wherein both ridge portions 25, 25 coincide with a straight line perpendicular to the optical axis P of the optical head 1 and passing through the emission point EP of the laser diode 11. Therefore, the emission point EP of the laser diode 11 lies on the same line with both ridge portions 25, 25, yet is sited on the same plane as the receiving surface 32 that abuts the ridge portions 25.

From the head 21a opposing the base 21b of the frame structure of the laser holder 21, vertex portions 24 protrude to correspond to respective abutment portions 23. Both vertex portions 24, 24 include an arc surface with a radius having a central axis C that is perpendicular to the optical axis P of the optical head 1 and passes through the emission point EP of the laser diode 11 (i.e. the straight line passing through the ridge portions 25). Therefore, the emission point EP of the laser diode 11 is positioned at a fixed distance H3 from the pressure surface 43 that abuts both vertex portions 24, 24.

The holder support 31 supports laser holder 21 by abutment and is mounted in the housing (not shown) of the optical pickup device. In other words, the laser holder 21 is fixed to the housing via the holder support 31.

The holder support 31 has the level receiving surface 32 that abuts the pair of ridge portions 25, 25 of the laser holder 21. In the receiving surface 32 a through-hole 33 is provided through which the laser light passes, the central axis of the through-hole 33 being made to coincide with the optical axis P of the optical head 1. The receiving surface 32 has been formed such as to become perpendicular to the optical axis P of the optical head 1.

Due to such a construction, the angular adjustment and the locational adjustment of the optical head 1 is easily performed. That is, because the ridge portions 25 abut the receiving surface 32 coinciding with a straight line that passes through the emission point EP, while the laser holder 21 moves rotationally around the ridge portions 25 even when the laser holder 21 is tilted for optical-axis adjustment of the laser light, the location of the emission point EP does not change in the direction of the optical axis of the optical head 1. Also, because the receiving surface 32 is a plane approximately perpendicular to the optical axis of the optical head 1, the location of the emission point EP does not change in the optical-axis direction either when the ridge portions 25 of the laser holder 21 are moved while abutting the receiving surface 32.

Therefore, the angular adjustment of the irradiation angle of the laser light and the locational adjustment of the emission point of the laser diode 11 can be performed simultaneously.

Also, the holder support 31 is provided with a pressure means for pressing the laser holder 21 onto the receiving surface 32. By this, the laser holder 21 is pressed onto the holder support 31, thus preserving the position of the laser holder 21.

Because the specific pressure means is identical to that shown with Embodiment 1, a description is omitted.

Also, a description of the angular adjustment and locational adjustment of the laser holder 21 is omitted because it is exactly as in Embodiment 1.

Embodiment 4

An optical head according to Embodiment 4 of the present invention will be explained based on FIG. 8.

Figure 8:
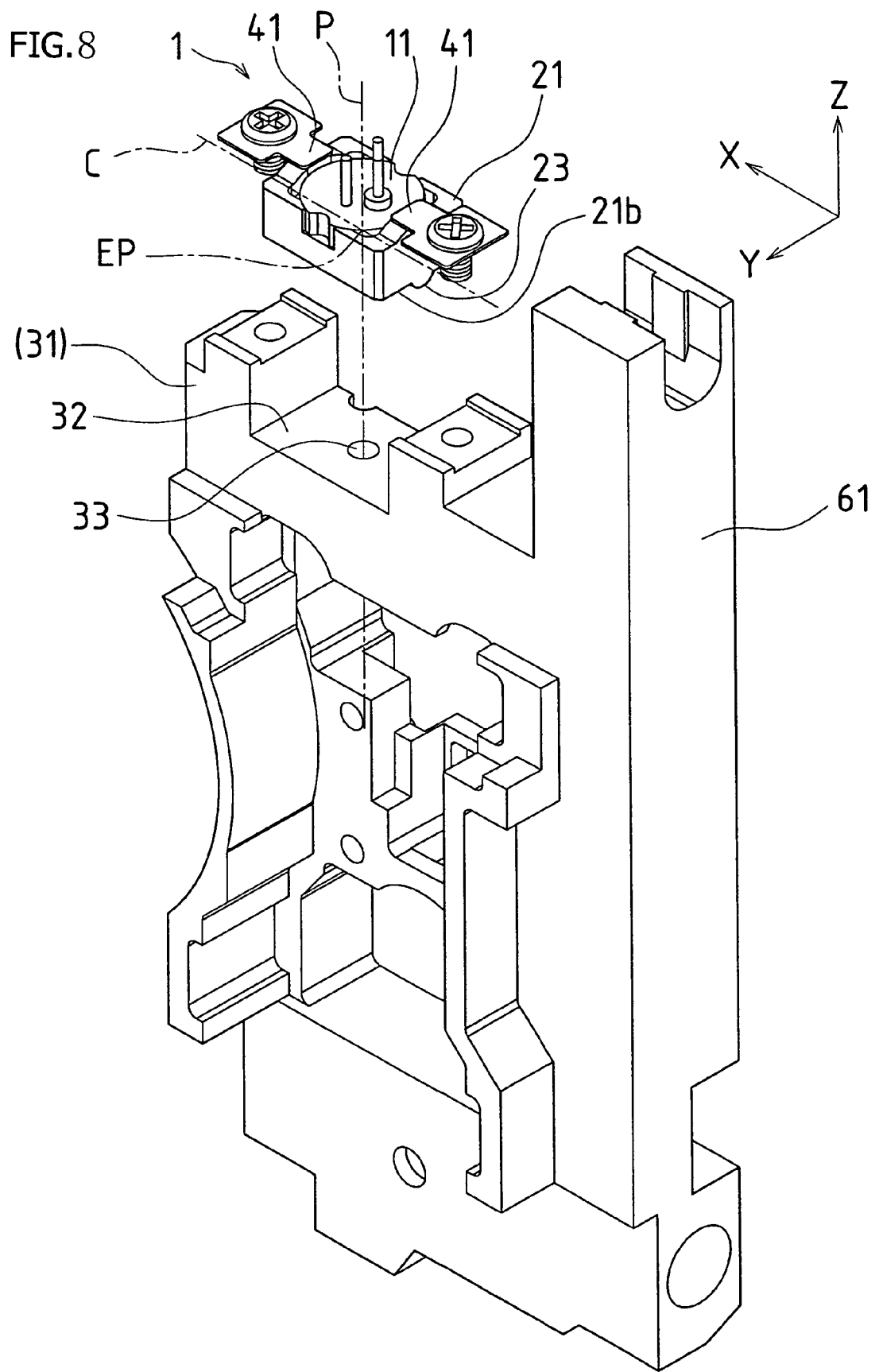
FIG. 8 is a perspective view of an optical head according to Embodiment 4 of the present invention.
Figure 9:
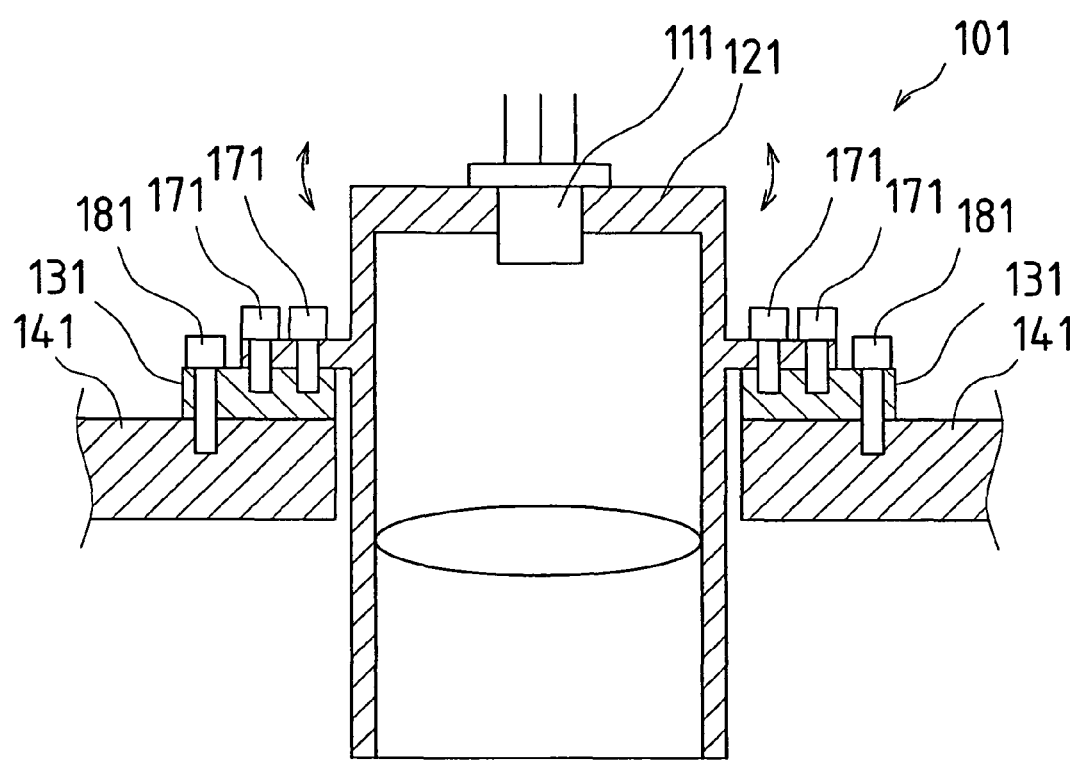
FIG. 9 is an outline view of an optical head of a first conventional example.
Figure 10:
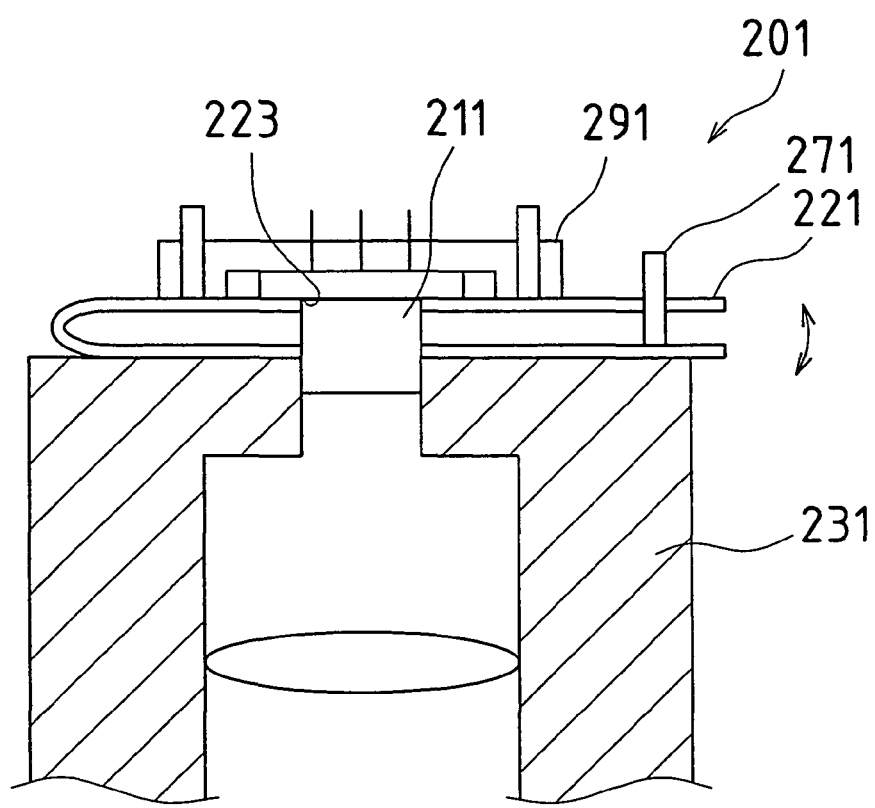
FIG. 10 is an outline view of an optical head of a second conventional example.
Figure 11:
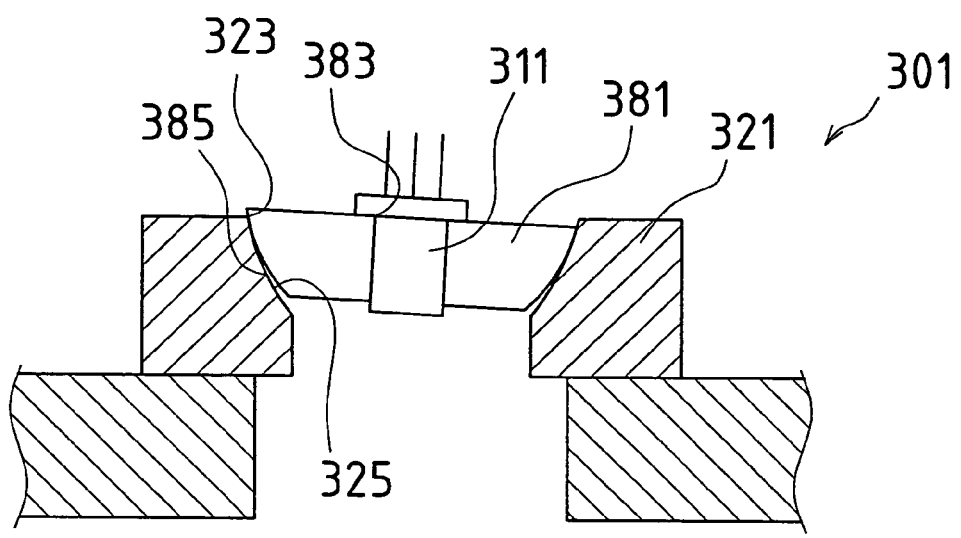
FIG. 11 is an outline view of an optical head of a third conventional example.

FIG. 8 is a perspective view of an optical head according to Embodiment 4 of the present invention.

In the present embodiment, the above-mentioned holder support 31 has been unified with a housing 61 of the optical pickup device.

The optical head 1 of the present embodiment includes a laser diode 11, a laser holder 21 retaining the laser diode 11, and the housing 61 with an integrated holder support 31 that by abutment supports the laser holder 21. Therefore, the cost of the manufactured product is reduced because the optical head 1 is directly mounted to the housing 61 of the optical pickup device, obviating the need for a dedicated part as the holder support 31.

The laser holder 21 can be any one of those applied in Embodiments 1 to 3. In short, the laser diode 11 is fixed in the laser holder 21, and at the base 21b of the frame structure of the laser holder 21 abutment portions 23 are formed that abut a receiving surface formed in the housing 61.

The housing 61 is a cabinet in which the laser holder 21 and other parts constituting the optical pickup device are mounted, for example a collimator lens, a prism, an objective lens, a light detector, and the like.

The housing 61 is provided with a level receiving surface 32 that abuts the pair of abutment portions 23, 23 of the laser holder 21. In the receiving surface 32 a through-hole 33 is provided through which the laser light passes, the central axis of the through-hole 33 being made to coincide with the optical axis P of the optical head 1. The receiving surface 32 has been formed such as to become perpendicular to the optical axis P of the optical head 1.

Due to such a construction, an identical effect as with Embodiment 1 can be obtained. That is to say, even when the laser holder 21 is tilted for optical-axis adjustment of the laser light, the location of the emission point EP does not change in the optical-axis direction, because the laser holder 21 moves rotationally around the central axis C, which is perpendicular to the optical axis P of the optical head 1 and passes through the emission point EP. Also, when adjusting the position of the laser holder 21 in a direction perpendicular to the optical axis P of the optical head 1 (XY-direction) for locational adjustment of the emission point EP of the laser light, the location of the emission point EP does not change in the optical-axis direction (Z-direction), either. Also, because there is no location change of the emission point EP in the optical-axis direction even when performing angular adjustment or locational adjustment, the angular adjustment and the locational adjustment can be performed simultaneously.

Also, housing 61 is provided with a pressure means for pressing laser holder 21 towards the receiving surface 32. By these, the laser holder 21 is pressed onto the receiving surface 32, thus preserving the position of the laser holder 21.

Because the specific pressure means is identical to that shown with Embodiment 1, a description is omitted.

Next, the method of adjusting the optical head 1 will be described.

In case of adjusting the optical axis P of the optical head 1 before the optical components are mounted to the housing 61, the optical head 1 is retained by an optical-head adjustment tool, and the angle and position of the laser holder 21 are adjusted in the same way as in Embodiment 1.

In case of adjusting the optical axis P of the optical head 1 after the optical components are mounted to the housing 61, because the optical pickup device functions as such, the optical-axis adjustment of the optical head 1 can be performed while directly measuring the output of the light detector. In this case, because slippage of the optical axis at the time of mounting the optical head 1 disappears, the optical-axis adjustment can be performed in a further optimized way.

Embodiment 5

An optical pickup device (not shown) according to Embodiment 5 of the present invention will be described.

The optical pickup device is composed among others of the optical head 1 described for Embodiments 1 to 4, a collimator lens that parallelizes the light emitted from laser diode 11, a beam-shaping prism that renders the parallelized laser light into a circular shape, an objective lens that concentrates the shaped laser light in its focal point for irradiation, and a detector that receives reflected light coming from the information storage medium and detects this optical signal.

Due to this composition, because even when tilting the laser holder 21 in order to adjust the optical axis of the laser light of the laser diode 11, there is no locational change in the optical-axis direction of the optical head 1 (i.e. the direction of the separation of the emission point and the collimator lens), the distance between the emission point of the laser diode 11 and the collimator lens does not change so that there is no change in the focal length. That is, the optical-axis adjustment of the optical pickup device can be simplified because the degree of parallelity of the laser light parallelized by means of the collimator lens is not changed due to the optical-axis adjustment, and the form of the light spot irradiated onto the information storage medium by concentration at the focal point does not change. Therefore, the efficiency of manufacturing the optical pickup device can be increased.

The present invention can be embodied and practiced in other different forms without departing from the spirit and essential characteristics thereof. Therefore, the above-described examples of execution are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An optical head for irradiating an information storage medium with laser light from the laser diode to perform recording/reproduction of information comprising a laser holder retaining a laser diode, and a holder support retaining the laser holder, wherein
    the laser holder is a frame structure that fixes the laser diode, having an abutment portion protruding from a base side of the frame structure,
    the holder support has a receiving surface that supports by abutment the abutment portion, and a through-hole that lets pass the laser light, and
    the receiving surface is a plane approximately perpendicular to an optical axis of the optical head, the abutment portion being an arc surface having a central axis, which passes through an emission point of the laser diode and is perpendicular to the optical axis such that when rotating the laser holder to make an angular adjustment and simultaneously moving the laser holder along the receiving surface for a locational adjustment, the emission point is maintained along the optical axis.

2. The optical head according to claim 1, wherein the abutment portion is formed in a pair, respectively in two opposing locations of the frame structure.

3. The optical head according to claim 1 or 2, wherein
    the laser holder has a vertex portion corresponding to the abutment portion, at a head side opposing the base side, and
    the holder support has a pressure means for pressing the vertex portion in a direction in which the abutment portion presses the receiving surface.

4. The optical head according to claim 3, wherein
    the vertex portion is a protuberance made up by an arc surface having the central axis, and
    the pressure means is configured to press the vertex portion by a pressure part having an even pressure surface perpendicular to the optical axis.

5. The optical head according to claim 4, wherein the distance from the central axis to the arc surface of the abutment portion is smaller than the distance from the central axis to the arc surface of the vertex portion.

6. The optical head according to claim 1, wherein the pressure part is a leaf spring.

7. The optical head according to claim 3, wherein the abutment portion has a taper surface continuously tangentially connecting to the arc surface.

8. The optical head according to claim 3, wherein the holder support is unified with the housing of an optical pickup device.

9. The optical head according to claim 1, wherein the abutment portion has a taper surface continuously tangentially connecting to the arc surface.

10. The optical head according to claim 1, wherein the holder support is unified with the housing of an optical pickup device.

11. An optical head for irradiating an information storage medium with laser light from a laser diode along an optical axis to perform recording/reproduction of information comprising:
    a laser holder retaining the laser diode, the laser holder having a frame structure having opposing base and head sides, the base side forming an abutment portion that is an arc surface having a central axis that passes through an emission point of the laser diode and is perpendicular to the optical axis, and the head side forming a vertex portion that is an arc surface having the same central axis;
    a holder support retaining the laser holder having a planar receiving surface that supports the abutment portion and defines a through-hole for light from the laser diode, the planar receiving surface being approximately perpendicular to the optical axis of the optical head; and
    a spring for pressing the vertex portion such that the abutment portion presses the receiving surface,
    wherein angular adjustment and locational adjustment of the laser holder occurs simultaneously by rotating the laser holder and moving the laser holder perpendicularly to the optical axis along the planar receiving surface, thereby maintaining the emission point along the optical axis.

12. The optical head according to claim 11, wherein the abutment portion is formed in a pair, respectively in two opposing locations of the frame structure.

13. The optical head according to claim 11, wherein the spring is configured to press the vertex portion with an even pressure surface perpendicular to the optical axis.

14. The optical head according to claim 11, wherein the distance from the central axis to the arc surface of the abutment portion is smaller than the distance from the central axis to the arc surface of the vertex portion.

15. The optical head according to claim 11, wherein the abutment portion has a taper surface continuously tangentially connecting to the arc surface.

16. An optical head for irradiating an information storage medium with laser light from the laser diode to perform recording/reproduction of information comprising:
- a laser holder retaining a laser diode, the laser holder being a frame structure that fixes the laser diode with an abutment portion protruding from a base side of the frame structure, the abutment portion being an arc surface having a central axis, which passes through an emission point of the laser diode and is perpendicular to the optical axis, and the laser holder having a vertex portion corresponding to the abutment portion at a head side opposing the base side; and
- a holder support retaining the laser holder and defining a through-hole that lets pass the laser light, the holder support having a receiving surface that supports by abutment the abutment portion, the receiving surface being a plane approximately perpendicular to an optical axis of the optical head, and the holder support having a leaf spring having an even pressure surface perpendicular to the optical axis for pressing the vertex portion in a direction in which the abutment portion presses the receiving surface, wherein the vertex portion is a protuberance made up by an arc surface centered about the central axis, and wherein angular adjustment and locational adjustment of the laser holder occurs simultaneously by rotating the laser holder and moving the laser holder perpendicularly to the optical axis along the planar receiving surface, thereby maintaining the emission point along the optical axis.

17. The optical head according to claim 16, wherein a distance from the central axis to the arc surface of the abutment portion is smaller than the distance from the central axis to the arc surface of the vertex portion.

18. The optical head according to claim 16, wherein the abutment portion is formed in a pair, respectively in two opposing locations of the frame structure and the abutment portion has a taper surface continuously tangentially connecting to the arc surface.

19. The optical head according to claim 16, wherein the holder support is unified with the housing of an optical pickup device.

* * * * *